(12) United States Patent
Ji et al.

(10) Patent No.: US 11,971,294 B2
(45) Date of Patent: Apr. 30, 2024

(54) DISTRIBUTED FIBER OPTIC SENSOR PLACEMENT PROCEDURE

(71) Applicant: NEC Laboratories America, Inc., Princeton, NJ (US)

(72) Inventors: Philip Ji, Cranbury, NJ (US); Ting Wang, West Windsor, NJ (US); Zilong Ye, La Verne, CA (US)

(73) Assignee: NEC CORPORATION, Tokyo (JP)

( * ) Notice: Subject to any disclaimer, the term of this patent is extended or adjusted under 35 U.S.C. 154(b) by 323 days.

(21) Appl. No.: 17/406,022

(22) Filed: Aug. 18, 2021

(65) Prior Publication Data

US 2022/0057254 A1 Feb. 24, 2022

Related U.S. Application Data

(60) Provisional application No. 63/067,393, filed on Aug. 19, 2020.

(51) Int. Cl.
*G01H 9/00* (2006.01)
*G02F 1/295* (2006.01)
*H04B 3/46* (2015.01)
*H04B 17/00* (2015.01)

(52) U.S. Cl.
CPC .......... *G01H 9/004* (2013.01); *G02F 1/295* (2013.01); *H04B 3/46* (2013.01); *H04B 17/00* (2013.01)

(58) Field of Classification Search
None
See application file for complete search history.

(56) References Cited

U.S. PATENT DOCUMENTS

| | | | | |
|---|---|---|---|---|
| 10,097,306 | B1* | 10/2018 | Chhillar | H04B 10/27 |
| 11,657,297 | B2* | 5/2023 | Lawrence | G06V 40/172 |
| | | | | 706/12 |
| 2013/0223218 | A1* | 8/2013 | Vasseur | H04L 45/38 |
| | | | | 370/232 |
| 2015/0117850 | A1* | 4/2015 | Prakash | H04B 10/032 |
| | | | | 398/2 |
| 2017/0013533 | A1* | 1/2017 | Felemban | H04W 40/00 |
| 2017/0366255 | A1* | 12/2017 | Sharma | H04B 10/032 |

* cited by examiner

*Primary Examiner* — Brenda H Pham
(74) *Attorney, Agent, or Firm* — Joseph Kolodka

(57) ABSTRACT

Aspects of the present disclosure describe distributed fiber optic sensing (DFOS) systems, methods, and structures that employ a distributed fiber optic sensor placement procedure that advantageously provides a desirable sensor coverage over a network at minimal cost.

9 Claims, 7 Drawing Sheets

DISTRIBUTED FIBER OPTIC SENSOR PLACEMENT PROCEDURE

CROSS REFERENCE

This disclosure claims the benefit of U.S. Provisional Patent Application Ser. No. 63/067,393 filed 19 Aug. 2020 the entire contents of which is incorporated by reference as if set forth at length herein.

TECHNICAL FIELD

This disclosure relates generally to distributed fiber optic sensing (DFOS) systems, methods, and structures. More specifically, it pertains to a procedure for distributed fiber optic sensor placement.

BACKGROUND

Distributed fiber optic sensing (DFOS) systems, methods, and structures have shown great utility in a number of unique sensing applications due to their intrinsic advantages over conventional technologies. They can be integrated into normally inaccessible areas and can function in very harsh environments. They are immune to radio frequency interference and electromagnetic interference and can provide continuous, real-time measurements along an entire length of fiber optic cable.

The recent advances in DFOS technologies have been shown to allow for continuous, long distance sensing over existing telecommunications networks, enabling telecommunications carriers to provide not only communications services but also a variety of sensing services including, but not limited to, traffic/road condition monitoring, infrastructure monitoring, and intrusion detection, using the same network. When used in this manner, an entire telecommunications network may now acting as a large-scale sensor, which we now refer to as "Network-as-a-Sensor" or "NaaSr". Similarly, other infrastructures having optical fibers as part thereof—such as power distribution grids and highway systems, can now be employed as large-scale distributed sensors to provide additional services and value, and to improve operational efficiency. This, we refer to refer to as "Infrastructure as-a-Sensor" or "IaaSr."

A critical challenge for NaaSr ro IaaSr is where to deploy the DFOS sensors and how to determine the sensing fiber route such that all the required fiber links in the given network infrastructure can be covered to provide NaaSr and/or IaaSr services

SUMMARY

The above problem is solved and an advance in the art is made according to aspects of the present disclosure directed to a sensor placement methodology for distributed fiber optic sensing systems (DFOS), methods, and structures.

In sharp contrast to the prior art, the method according to the present disclosure places sensors in a fiber optic network wherein the number of sensors deployed is defined by:

$$\min: \sum_{s,d \in V} \theta_{s,d}$$

for the network infrastructure G(V, E), where V is the set of nodes; E is the set of links; R: the sensing range limit of a given sensor; $d_{ij}$: the distance of link (i, j); $w_{ij}$: the distance of the weight of link (i, j), which is obtained by $d_{ij}/R$;

wherein the following Boolean variables are determined:

$\theta_{s,d}$: 1 if a sensor is deployed at node S, with termination point at node d, where s, d∈ V; 0 otherwise;

$r_{s,d,ij}$: 1 if the sensing fiber route between S and d passes though link (i,j), where $r_{s,d,ij}$∈ V; 0 otherwise;

and the following constraints are considered:

$$\sum_{i,j \in V} r_{s,d,i,j} \cdot w_{i,j} \leq \theta_{s,d}, \forall s, d \in V$$

$$\sum_{s,d \in V} r_{s,d,i,j} + \sum_{s,d \in V} r_{s,d,j,i} \geq 1, \forall i, j \in V$$

$$\sum_{i,j \in V} r_{s,d,i,j} - \sum_{i,j \in V} r_{s,d,j,i} = \begin{bmatrix} \theta_{s,d} & i = s \\ -\theta_{s,d} & i = d \\ 0 & \text{otherwise} \end{bmatrix} \forall s, d \in V.$$

BRIEF DESCRIPTION OF THE DRAWING

A more complete understanding of the present disclosure may be realized by reference to the accompanying drawing in which.

DESCRIPTION

Figure 1:
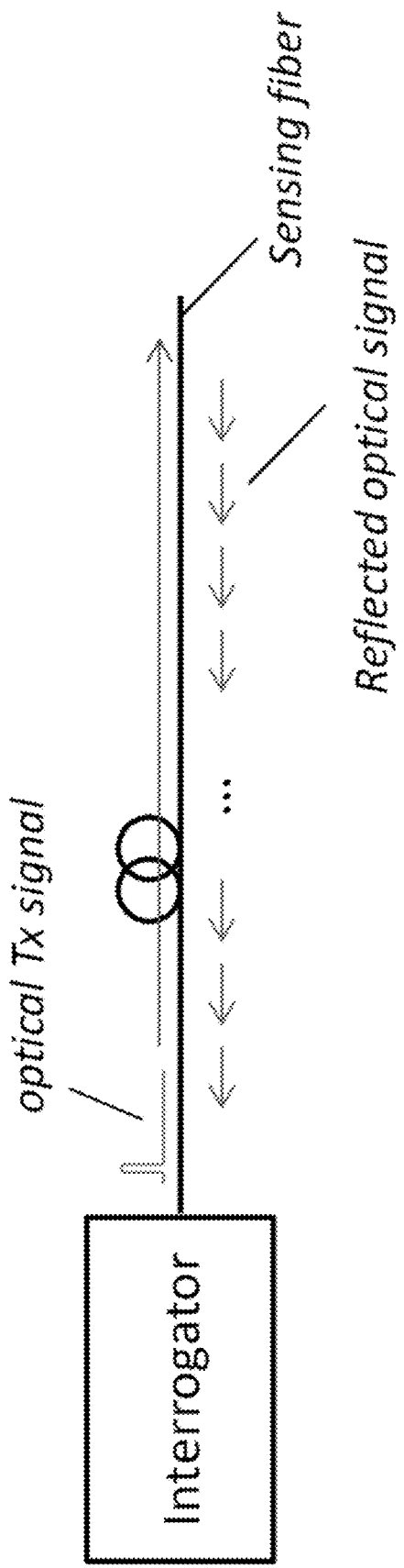
FIG. 1 is a schematic diagram of an illustrative distributed fiber optic sensing system and operation generally known in the art.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background—and with reference to FIG. 1 which is a schematic diagram of an illustrative distributed fiber optic sensing system generally known in the art—we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

As we have previously noted, A critical challenge for IaaSr or NaaSr implementation/deployment is where specifically to deploy the DFOS sensors and how to determine a sensing fiber route such that all required fiber optic links in a given network infrastructure can be covered to provide the IaaSr services. We have conveniently named this problem the DFOS placement problem.

Figure 2:
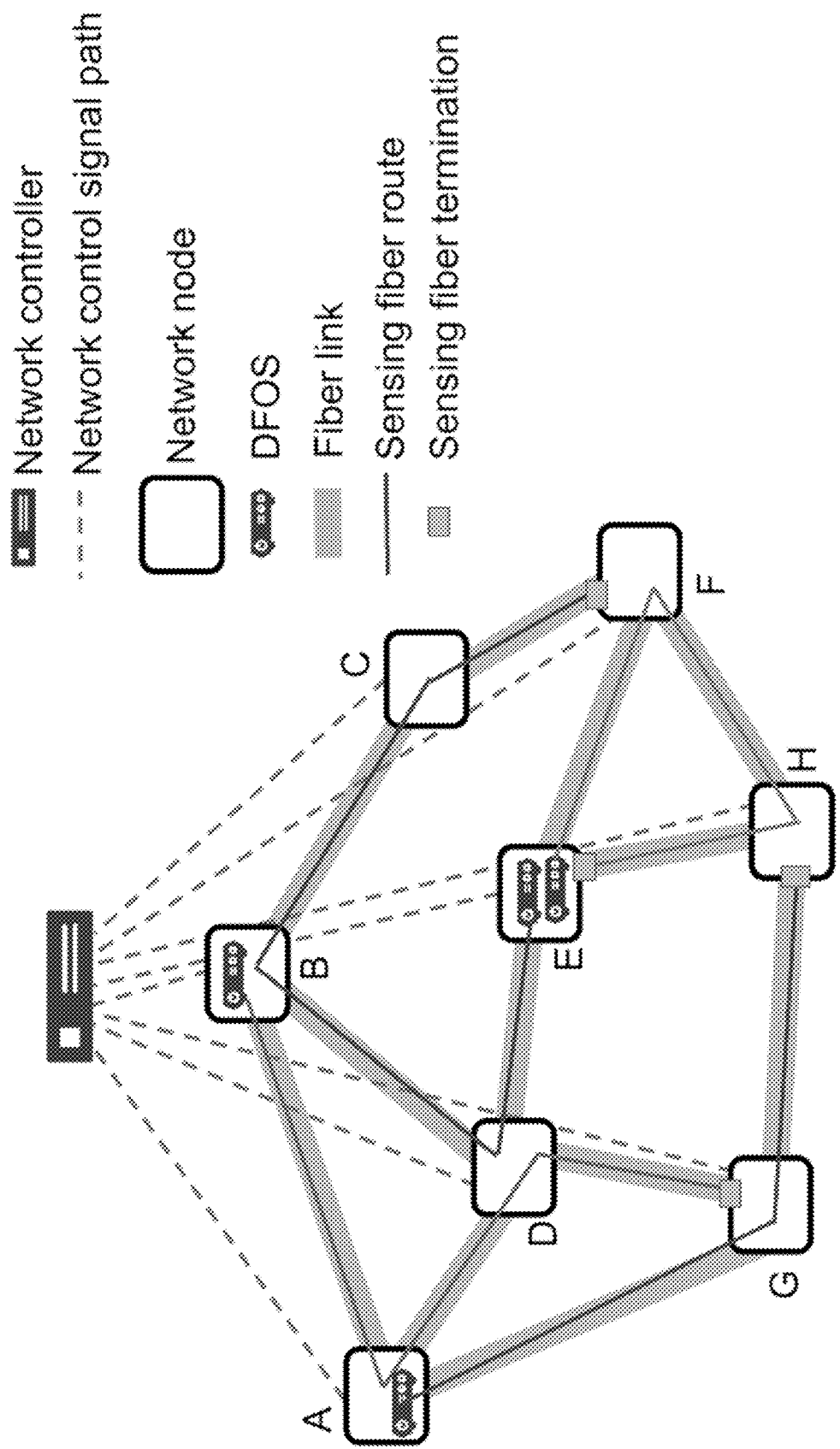
FIG. 2 is a schematic diagram illustrating distributed fiber optic sensor placement according to aspects of the present disclosure.

FIG. 2 is a schematic diagram illustrating distributed fiber optic sensor placement according to aspects of the present disclosure. As shown in FIG. 2, an IaaSr network generally includes a set of nodes connected by a set of fiber optic links that are monitored (or sensed) by one or more DFOS sensors.

Advantageously, network carriers and/or service providers can place one or more DFOS sensor hardware elements at a network node and connect them to one or more fiber optic links to form a sensing fiber route. Those skilled in the art will appreciate that while such route may be linear, it is not necessarily straight.

We note that the total distance of a sensing fiber route should be within the sensing range limit (e.g., 80 km), using existing sensing techniques.

In FIG. 2, sensing fiber route A-G-H has a DFOS sensor deployed at node A, traverses two hops, and then terminates at node H. Operationally, measured data from sensing fiber routes can be stored and processed locally, or can be sent to a remote, centralized controller for analysis.

When all necessary links in the network are operating and continuously providing sensing function(s), IaaSr operation/function is achieved. Due to hardware cost and operational expense, one objective of DFOS sensor placement is to minimize the number of DFOS sensors used to fully/completely monitor/sense all necessary fiber optic links.

We now note—and as will be readily understood and appreciated by those skilled in the art—the DFOS sensor placement problem described is both novel and challenging. More specifically, it differs from a coverage problem experienced in wireless sensor networks, because the latter considers the coverage in terms of circular areas while DFOS sensor placement necessarily must consider sensor coverage with respect to network topology. It also differs from a regenerator placement problem, as regenerator placement considers placement of regenerators to ensure reachability of established light paths, while DFOS sensor placement necessarily must consider monitoring of all necessary physical fiber optic links.

Perhaps the most similar problem is a classical vertex cover problem, however, in evaluating a vertex cover, a selected node can only cover its attached links, while in DFOS sensor placement, a sensor can cover one or more fiber optic links over multiple hops. Accordingly, the prior art does not provide comprehensive solution(s) to DFOS sensor placement that is the subject of the instant disclosure.

As we shall show and describe, we further describe our inventive solution employing an Integer Linear Programming-based (ILP) optimal solution that minimizes cost of sensors. As the ILP solution may be intractable when network size is large, we describe a fast heuristic algorithm, called Explore-and-Pick (EnP), which achieves a substantial performance improvements and close-to-optimal performance. We evaluate the performance of these solutions through comprehensive simulations.

Problem Statement

To begin our disclosure of our inventive solution, we provide definition to the DFOS sensor placement problem (also known as DFOS placement problem).

The DFOS placement problem may be defined as: given a network infrastructure, our goal is to determine: (1) where to place sensors, and (2) how to determine sensing fiber optic routes with the objective of minimizing the number of sensors used while all required/necessary fiber optic links in the given network infrastructure are covered/sensed/monitored.

To solve the DFOS placement problem, we consider the following conditions. First, each sensor must have the ability/capability to sense data in a single-direction with a limited sensing range. Second, each sensing fiber route is considered a linear route, in which splits (e.g., tree-like route) are not allowed. Finally, each sensor is coupled with only one sensing fiber route, and concurrently sensing multiple routes is not considered.

The Integer Linear Programming (ILP) Solution

As we shall show and describe, we employ ILP to formulate the DFOS problem to facilitate the optimal solution. Accordingly, the following parameters are given:

G(V, E): the network infrastructure, where V is the set of nodes, E is the set of links;

R: the sensing range limit;

$d_{ij}$: the distance of the link (i, j);

$w_{ij}$: the distance of the weight of link link (i, j), which is obtained by $d_{ij}/R$;

The following Boolean variables are to be determined:

$\theta_{s,d}$: 1 if a sensor is deployed at node S, with termination point at node d, where s, d∈ V; 0 otherwise;

$r_{s,d,ij}$: 1 if the sensing fiber route between S and d passes though link (i,j), where $r_{s,d,ij}$∈ V; 0 otherwise;

The objective is to minimize the number of sensors used, which is defined as:

$$\min: \sum_{s,d \in V} \theta_{s,d} \quad (1)$$

The following constraints are considered:

$$\sum_{i,j \in V} r_{s,d,i,j} \cdot w_{i,j} \le \theta_{s,d}, \forall s, d \in V \quad (2)$$

$$\sum_{s,d \in V} r_{s,d,i,j} + \sum_{s,d \in V} r_{s,d,j,i} \ge 1, \forall i, j \in V \quad (3)$$

$$\sum_{i,j \in V} r_{s,d,i,j} - \sum_{i,j \in V} r_{s,d,j,i} = \begin{bmatrix} \theta_{s,d} & i = s \\ -\theta_{s,d} & i = d \\ 0 & \text{otherwise} \end{bmatrix} \forall s, d \in V. \quad (4)$$

Here, Eq. (2) represents the sensing range limit constraint that the distance of any sensing fiber route must be less than the sensing range limit R. Eq. (3) ensures that each link (i,j) can be sensed at least once from either direction. Eq. (4) ensures that each sensing fiber route is a linear route.

The Fast and Efficient Heuristic Solutions

We now disclose two fast heuristics, Random-Fit and Explore-and-Pick (EnP) that are advantageously employed in our sensor placement methodology according to aspects of the present disclosure.

Random-Fit: This procedure provides a baseline heuristic solution for addressing DFOS sensor placement according to aspects of the present disclosure. Operationally, this procedure first randomly selects a node that is attached with an uncovered link for placing the sensor. Second, a sensing fiber route is set to start from the selected node, traverse to its neighbor node through one of its remaining uncovered links and continue to explore the next-hop until the sensing range limit is reached. These two steps will repeat until all the links are marked as covered. The detailed steps of Random-Fit are described as follows.

The Random-Fit Procedure

Step 0: Run shortest path algorithm to find out the distance between each node pairs in the given network.

Step 1: Initialize a list assignment to store the assignment of DFOS sensor placement and the corresponding sensing fiber routes. Initialize a set uncovered that contains all the fiber links in the given network.

Step 2: Randomly select a node s that is attached to an uncovered fiber link from uncover to place a sensor.

Step 3: Among all the neighbor nodes that are within the sensing range limit of s, randomly select one as termination point d. The shortest path between s and d serves as the sensing fiber route r. The above is stored in assignment.

Step 4: Remove all the links traveled by r from uncovered.

Step 5: Repeat Step 2 to Step 4 until uncovered is empty. Return assignment and terminate.

Explore-and-Pick (EnP): Although the Random-Fit procedure can generate a valid solution for DFOS sensor placement, it is not particularly cost-efficient. Hence, we describe another fast heuristic, EnP, which can achieve a close-to-optimal performance.

According to aspects of the present disclosure, EnP includes two procedures. The first procedure explores all possible sensing fiber routes for the given network infrastructure, through a novel distance-limited route exploration based on depth-first search. The second procedure takes all the possible sensing fiber routes S as input, and considers all of the fiber links in the given network infrastructure to be universe set U. Then, it finds a minimum subset of sensing fiber routes M from S whose union equals U. This is actually transformed to the classic minimum set cover problem, which can be solved by a greedy algorithm with modifications to allow consideration of sensor placement. The detailed steps of EnP are as follows.

The Explore-and-Pick (EnP) Procedure

Step 0: Initialize a list assignment to store the assignment of DFOS sensor placement and the corresponding sensing fiber routes. Initialize a set uncovered that contains all the fiber links in the given network. Initialize a set all_routes_set to store all the possible sensing fiber routes from each node in the given network.

Step 1: For each node n that has not been explored yet, repeat Step 2 through Step 9. If all the nodes have been explored, go to Step 10.

Step 2: Initialize three data structures as follows. First, a stack next_hop is created to store all the candidate nodes for the next hop of a sensing fiber route that originates from n. The stack will be initialized with n. Second, a list visited will be created to keep track of the nodes that have been visited. This will ensure that there exist no duplicated links in the sensing fiber route. This list is initialized with n. Finally, a set route_set is created to store all the possible sensing fiber routes that originate from n. It is empty at first.

Step 3: While next_hop is not empty, repeat Step 4 through Step 8; otherwise, go to Step 9.

Step 4: Pop the last-in node from next_hop and denote it as current.

Step 5: For each sensing fiber route r in route_set, if the very last hop of r is current or if route_set is empty, repeat Step 6 through Step 8. If all the sensing fiber routes have been checked, go back to Step 3.

Step 6: For each neighbor node nn of current, generate a new sensing fiber route r_new by extending the existing route r from its last hop current to nn (if route_set is empty, r_new will be initialized with a route with only one hop from current to nn). Repeat Step 7 and Step 8 until all the neighbor nodes of current have been processed, then go back to Step 5.

Step 7: If r_new is a linear route, and in the meantime, if the distance traversed by r_new is less than the sensing limit range, then add r_new to route_set and continue to Step 8; otherwise, go back to Step 6 and check the next neighbor node.

Step 8: If nn is not in visited, add nn to next_hop and add nn to visited; otherwise, go back to Step 6 and check the next neighbor node.

Step 9: Add route_set to all_routes_set.

Step 10: While uncovered is not empty, go to Step 11; otherwise, go to Step 12.

Step 11: From all_routes_set, select the sensing fiber route r_max that has the maximum number of overlapping links with uncovered. Select the source node of r_max to deploy a sensor and the other end as termination point d. Remove the fiber links traveled by r_max from uncovered. Add r_max to assignment. Back to Step 10.

Step 12: Return assignment and terminate.

Numerical Results

We conducted comprehensive simulations to validate our inventive solutions according to aspects of the present disclosure. For these simulations, the fiber optic sensing range limit is set to be 80 km, given the existing fiber optic sensing techniques employed. Due to this constraint, network infrastructures selected for evaluation are regional or metro fiber optical networks using real-world datasets. Key network parameters are shown in Table 1. Note that we performed pre-processing that clips the links that are greater than the sensing range limit to be 80 km, so that those links can also be covered by DFOS sensors.

We compare Random-Fit, EnP and the ILP solution in terms of the number of sensors used. The results are shown in Table 2. We can see that the ILP solution provides the lower bound; however, as the network scale becomes large, it is not able to yield a result in a reasonable amount of time. In addition, we can observe that EnP can achieve a performance that is close to the lower bound set by the ILP solution. EnP outperforms Random-Fit by 13% in average and 25% at best, respectively. We can conclude that EnP is a fast and cost-efficient solution for addressing the DFOS placement problem

TABLE 1

Network Parameters

|  | Oxford | INS | ValleyNet | Palmetto | ION | US_Carrier |
|---|---|---|---|---|---|---|
| # Nodes | 19 | 24 | 31 | 45 | 98 | 150 |
| # Links | 24 | 28 | 33 | 70 | 97 | 171 |
| Avg. Node Deg. | 2.53 | 2.33 | 2.13 | 3.11 | 1.98 | 2.28 |
| Avg. Link Dist. | 51.44 | 59.06 | 44.78 | 54.96 | 38.02 | 49.80 |

TABLE 2

No. of Sensors Used

|  | Oxford | INS | ValleyNet | Palmetto | ION | US_Carrier |
|---|---|---|---|---|---|---|
| Random Fit | 21.42 | 26.7 | 27.06 | 61.38 | 80.9 | 151 |
| Explore-N-Pick | 19 | 26 | 23 | 55 | 60 | 132 |
| ILP | 18 | 26 | 23 | * | * | * |

Figure 3:
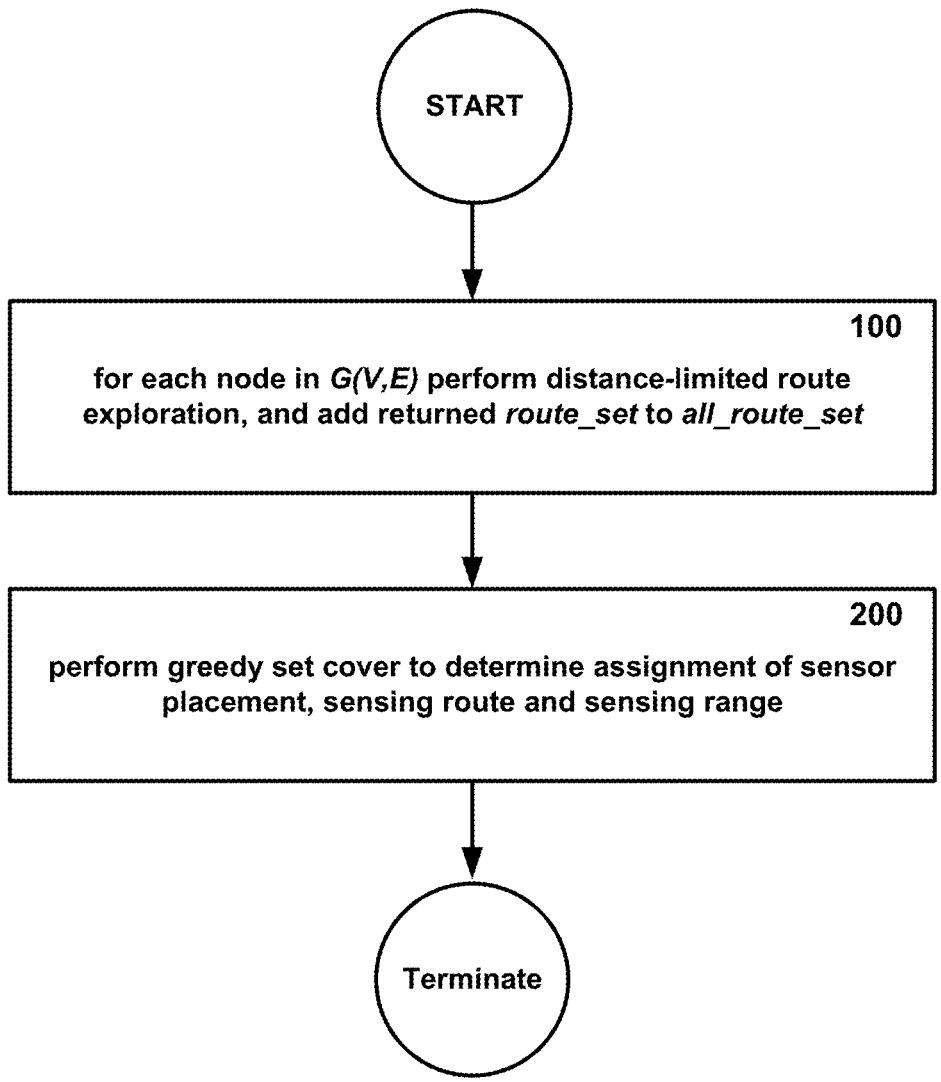
FIG. 3 is a flow diagram illustrating an overall distributed fiber optic sensor placement procedure according to aspects of the present disclosure.
Figure 4A:
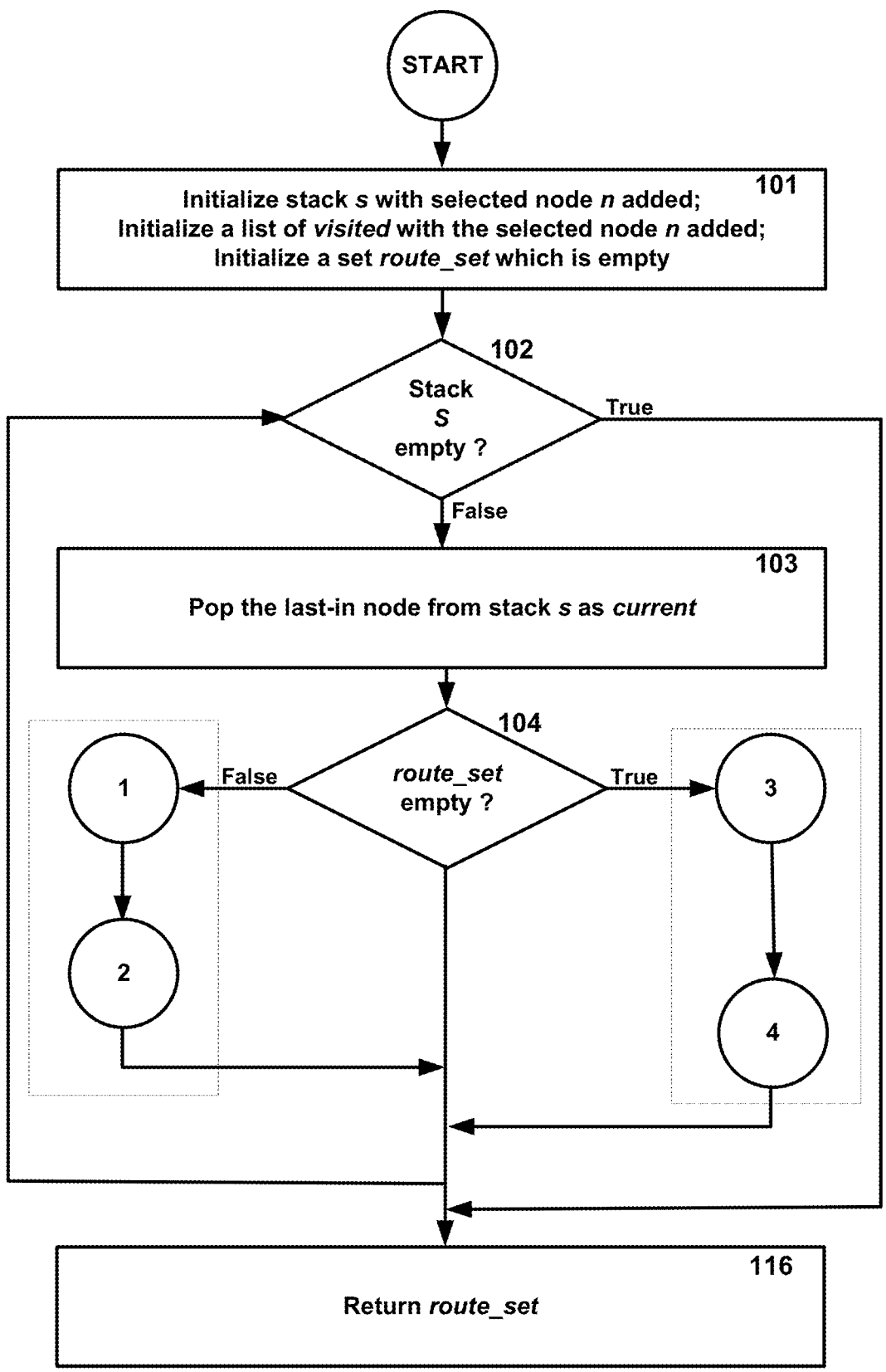
FIG. 4(A), FIG. 4(B), and FIG. 4(C) are flow diagrams that collectively illustrate a first sub-procedure of distributed fiber optic sensor placement procedure according to aspects of the present disclosure.
Figure 4B:
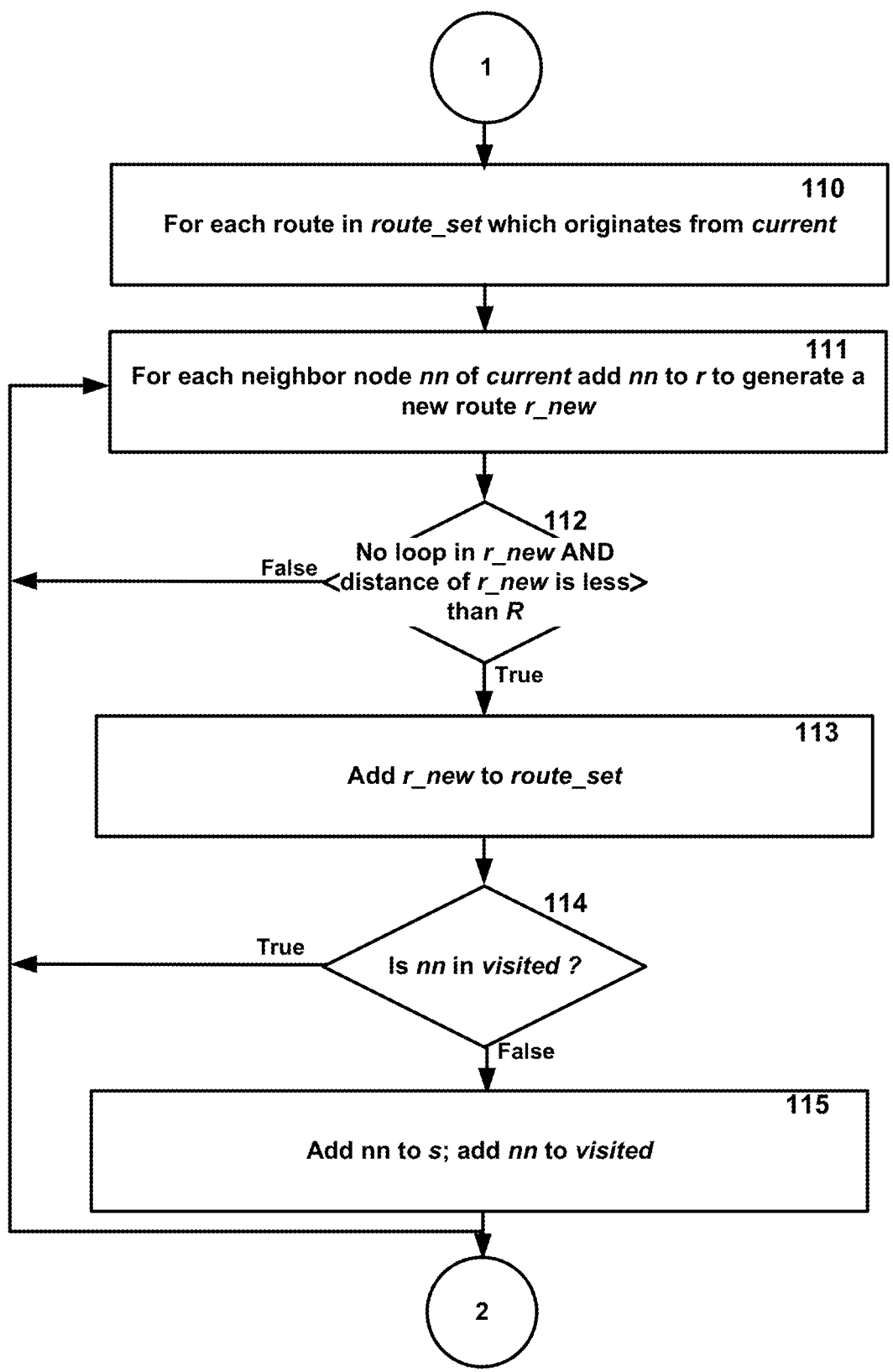
Figure 4C:
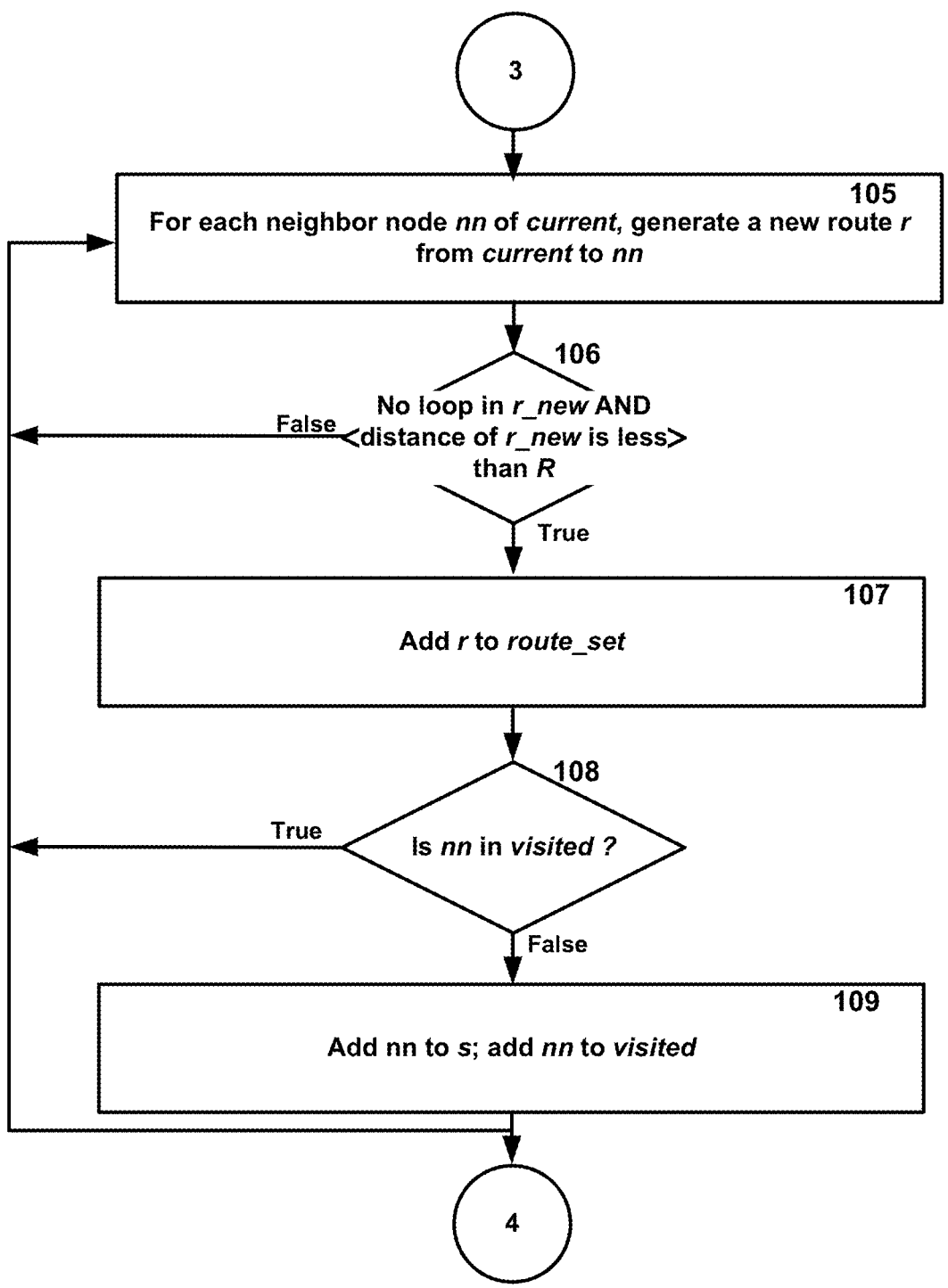
Figure 5:
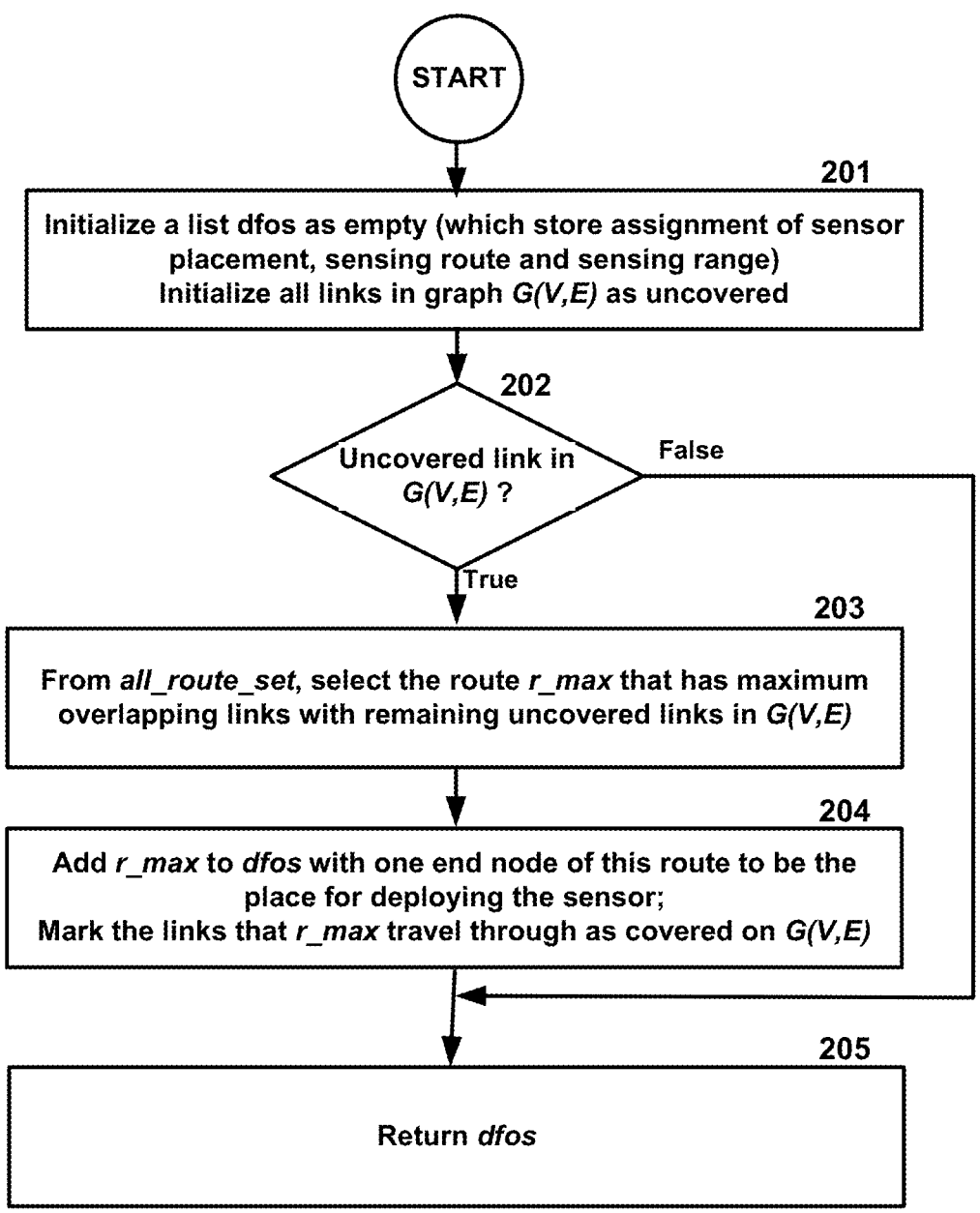
FIG. 5 is a flow diagram that illustrates a second sub-procedure of distributed fiber optic sensor placement procedure according to aspects of the present disclosure.

FIG. 3 is a flow diagram illustrating an overall distributed fiber optic sensor placement procedure according to aspects of the present disclosure;

FIG. 4(A), FIG. 4(B), and FIG. 4(C) are flow diagrams that collectively illustrate a first sub-procedure of distributed fiber optic sensor placement procedure according to aspects of the present disclosure; and FIG. 5 is a flow diagram that illustrates a second sub-procedure of distributed fiber optic sensor placement procedure according to aspects of the present disclosure.

With simultaneous reference to these figures, we may begin our review of our flow diagram(s) which outline two main procedure steps namely, step 100 and step 200 as shown illustratively in FIG. 3.

Step 100 is the first illustrative sub-procedure step in our method, which is denoted by a depth-limited route exploration. Note that all the detailed steps in this first sub-procedure are detailed from step 101 to step 116 in FIGS. 4(A), 4(B), and 4(C).

As an overview, this step 100 includes an iteration that for each node n in the given network infrastructure G(V, E) a call is made to the depth-limited route exploration sub-procedure to obtain all the possible sensing routes (denoted by route_set) for node n—if we deploy a sensor on it.

Iteratively, each node's route_set is obtained and added to a set called all_route_set, which includes all possible assignments for sensor placement, sensing route and sensing range. When all the nodes have been checked and their corresponding route sets have been added to all_route_set, the operation proceeds to step 200. Note that set all_route_set will be used as the input to step 200.

Step 200 is the second sub-procedure in our inventive method, which is denoted by greedy set cover. Note that all the detailed steps in this second sub-procedure are detailed from step 201 to step 205 as illustratively shown in FIG. 5.

From all possible sense routing all_route_set, this second sub-procedure adopts a greedy set cover method and finds a close-to-minimum subset that ensures each and every link in the given network infrastructure G(V, E) can be covered at least once.

Step 101 is an initialization step of the sub-procedure of depth-limited route exploration. Operationally, at least three data structures are created and initialized. First, a stack s is created to store all the nodes that need to be visited for the given node n. The stack is initialized with the given node n and added with additional nodes when those additional nodes meet certain conditions (see steps 106 and 108, and steps 112 and 114).

Secondly, a list, visited, is initialized to track nodes that have been visited during the depth-limited route exploration process. This ensures that there are no duplicated sensing routes in the final DFOS assignment. The list is initialized to contain the given node n. Finally, a set, route_set, is initialized as empty, which will contain all possible sensing routes if we deploy a sensor at the given node n.

Step 102 is the entry point of a repeating loop, e.g., a "while" loop. It checks if stack s is empty or not. If the stack is not empty, it will enter the while loop and continue to step 103. If the stack is empty, it will exit the while loop, go to step 116, and return the route_set for the given node n. Here, when the stack is empty, it means that all the neighboring nodes that are within the sensing limit R for the given node n have been checked, so route_set contains all possible sensing routes for the given node n.

Step 103 operates to pop up the last-in node from stack s which is denoted as node current. This current node identifies the location of a current exploration. Future steps will determine whether or not to add current and its neighbors as a possible sensing routes in route_set.

Step 104 checks if set route_set is empty or not. If it is empty, node current is considered the original node of the sensing route and any other possible sensing routes are explored, as the process proceeds to step 105. If route_set is not empty, then routes from route_set—whose predecessor is current—are checked, and any other possible sensing routes are explored, and the process proceeds to step 110.

Step 105 is the entry point of a control loop, i.e., a "for-loop". Each neighbor node nn of current is checked and a route r from current to nn is generated. This route is subsequently checked in step 106 to determine whether or not it will be added to route_set.

Step 106 checks the condition of route r that is extended from current to nn. The check condition is that route r must be a linear route that contains no loop, and in the meantime, the distance traveled by r is less than the sensing range limit R. If route r satisfies the above condition, r is added to route_set as shown in step 107. If the condition is not met, the procedure returns to step 105 wherein the next neighbor node and its corresponding newly generated route is checked.

Step 107 adds the route r to the set of route_set.

Step 108 checks if neighbor node nn has been visited or not. If nn has been visited before, then the procedure returns to step 105 and check the next neighbor node. If nn has not been visited, then the procedure proceeds to step 109.

Step 109 operates to add neighbor node nn to stack s, which permits further exploration of any other possible sensing route(s) extended from this node. In this step, nn is also added to the list of visited nodes.

Step 110 is executed when the condition in step 104 is not met. In an illustrative implementation, it is the entry point of an outer loop of a double for-loop. Here, the procedure checks each existing sensing route r in the set of route_set, and proceed with any one(s) that originate from node current.

Step 111 is illustratively an entry point of an inner loop of a double for-loop. It checks each neighbor node nn of current and generates a new route r_new that is constructed by adding node nn to the existing sensing route r.

Step 112 checks whether or not route r_new is a linear route without a loop, and whether the distance traveled by r_new is less than the sensing limit R. If the above condition holds true, then the procedure proceeds to step 113, where r_new is added to route_set. If the condition is not met, the procedure returns to step 111 and checks the next neighbor node and its corresponding newly generated route.

Step 113 adds the route r_new to the set of route_set.

Step 114 checks if neighbor node nn has been visited or not. If nn has been visited before, then the procedure returns to step 111 and checks the next neighbor node. If nn has not been visited, then the procedure continues at step 115.

Step 115 adds neighbor node nn to stacks, which allow further exploration of any other possible sensing route extended from this node. In this step, nn is added to the list of visited nodes.

Step 116 is executed when the condition in step 102 holds true. It returns set route_set to that position in the procedure where the procedure was called in the first sub-procedure in step 100.

Step 201 is the initialization phase of the second sub-procedure. Operationally, two data structures will be created.

First, the procedure will initialize a list called dfos as empty. This list stores the assignment of distributed fiber optical sensor placement, including the sensor placement assignment, the sensing route assignment and the sensing range assignment. Second, the procedure initializes each link in G(V, E) to be in the state of uncovered.

Step 202 is the entry point—illustratively of a while loop—and checks whether or not there exists a link in G(V, E) that is still marked as uncovered. If the condition holds true, the procedure proceeds to step 203; otherwise, it proceeds to step 205 and returns dfos. Here, if there still exists uncovered links in G(V, E), it is necessary to deploy more sensors to cover those uncovered links, which is why the operation proceeds the while loop body in step 203. This ensures that the procedure terminates when the whole network infrastructures are fully covered by distributed fiber optical sensors.

Step 203 selects the route r_max from all_route_set, which has the maximum overlapping or common links with the remaining uncovered links in G(V, E). This is a greedy method whose purpose is to achieve the coverage of all the links in G(V, E) with the minimum subset from all_route_set.

Step 204 adds the selected most overlapping router max to the list of dfos. In addition, one of the two end nodes on route r_max is selected as the location to place a sensor. Lastly, this step marks any links that traveled by r_max as covered on the G(V, E).

Step 205 is executed when the while loop condition in step 202 holds false. In other words, when all the links in G(V, E) have been covered by the distributed fiber optical sensor assignment in dfos, the procedure will terminate and return dfos. Note that the distributed fiber optical sensor assignment result(s) are stored in dfos.

The Application of our DFOS Placement Procedure

Returning our attention once again to FIG. 2 which shows the application of our inventive DFOS placement procedure to a fiber optic network. As will be observed from this figure, there exist multiple nodes in the illustrated fiber optic network, and there are multiple fiber optic links between some of the nodes. The fiber optic links are those links that need to be monitored (sensed) by DFOS sensors. Note that the set of fiber optic links that are to be monitored could be all of the fiber optic links in the network.

Operationally, the optical nodes are controlled by a network controller, which can be placed at one of the nodes, or can be located in a remote location or in multiple locations. The network information, including the network topology, information of each node, information of each link (such as the two end nodes, the link distance, whether sensing is required on this link), and so on, are collected by the network controller. Based on the information, the network controller uses our inventive DFOD placement procedure according to aspects of the present disclosure to determine the network sensing configuration. The configuration settings are then sent to the individual nodes.

When an optical node receives respective network configuration and/or instructions, it executes the instructions, which may include placing/activating one or more DFOS sensor hardware elements at that node and connecting them to the respective fiber, and/or connect two fibers from two links together to form a pass-through path (this can be done via a fiber patch panel or optical switch), and/or terminate a fiber to prevent large reflection at the end surface of the termination point.

Each deployed DFOS sensor also uses the instruction from the network controller to configure sensing distance and any related parameters, then start the on-going sensing/measurement. The collected data are separated into individual links, if the sensor's sensing range spans across multiple hops. The measure data for each fiber link can be stored and processed locally, or can be sent to remote or centralized processor to be analyzed or stored.

Due to the resource optimization advantage of the DFOS placement procedure, the number of DFSO sensors in the network can be kept low, saving hardware expense while providing a speed and efficiency that further reduces network planning time significantly—especially as compared with contemporary methods. As such, operational cost(s) are likewise reduced for carriers.

Note that since all required links in the fiber optic network are performing sensing function continuously, the IaaSr (NaaSr) function is achieved, which improves the network operation efficiency (such as preventing cable cut, monitoring cable health, monitoring operation environment), and bring new service and revenue to the network owner (such as providing traffic information to municipal government, monitoring road condition for highway operator, monitoring utility pole health for utility company, monitoring city noise for accident detection, etc.)

At this point, while we have presented this disclosure using some specific examples, those skilled in the art will recognize that our teachings are not so limited. Accordingly, this disclosure should only be limited by the scope of the claims attached hereto.

The invention claimed is:

1. A distributed fiber optic sensor placement method comprising:
providing a fiber optic network comprising a set of nodes and a set of fiber optic links defined by G(V, E) where G is the fiber optic network, V is the set of nodes, and E is the set of links;
for each node in G(V, E),
determine all possible sensing routes (all_route_set) in the fiber optic network; and
determine the minimum set of sensing routes in the alt_route_set that fully cover all the links in the fiber optic network; and
determining sensor placement locations to be at either one of two ends of a sensing route that is within the minimum set of sensing routes in the alt_route_set that fully cover all the links in the fiber optic network; and
deploying the sensors at the sensor placement locations so determined.

2. The method of claim 1 further comprising:
determining a set of possible sensing routes for a given node in the fiber optic network when there is no existing sensing route defined for the given node.

3. The method of claim 2 wherein a route is only added to all_route_set when that route simultaneously contains no loop and a distance of the route is less than a sensing range limit of the sensor being placed.

4. The method of claim 1 further comprising determining a set of possible sensing routes for a given node in the fiber optic network when there are existing sensing route defined for the given node.

5. The method of claim 1 wherein the fiber optic network include a network controller that is configured to execute the method and a user configurable fiber optic connector switch that optically connects a sensor to a node.

6. The method of claim 5 wherein the network controller communicates network configuration instructions to the nodes included in the fiber optic network.

7. The method of claim 6 wherein the nodes receive the network configuration instructions and in response locally configure including placement of sensor(s) and/or fiber optic links through the fiber optic connector switch.

8. The method of claim 7 wherein the sensors receive the network configuration information and configure respective sensing settings and data reporting.

9. The method of claim 1 wherein the number of sensors deployed is defined by:

$$\min: \sum_{s,d \in V} \theta_{s,d}$$

for the network infrastructure G(V, E), where V is the set of nodes; E is the set of links; R: the sensing range limit of a given sensor; $d_{ij}$: the distance of link (i, j); $w_{ij}$: the distance of the weight of link (i, j), which is obtained by $d_{ij}/R$;
wherein the following Boolean variables are determined:
$\theta_{s,d}$: 1 if a sensor is deployed at node S, with termination point at node d, where s, d∈ V; 0 otherwise;
$r_{s,d,ij}$: 1 if the sensing fiber route between S and d passes though link (i,j), where $r_{s,d,ij}$∈ V; 0 otherwise;
and the following constraints are considered:

$$\sum_{i,j \in V} r_{s,d,i,j} \cdot w_{i,j} \leq \theta_{s,d}, \forall s, d \in V$$

$$\sum_{s,d \in V} r_{s,d,i,j} + \sum_{s,d \in V} r_{s,d,j,i} \geq 1, \forall i, j \in V$$

$$\sum_{i,j \in V} r_{s,d,i,j} - \sum_{i,j \in V} r_{s,d,j,i} = \begin{cases} \theta_{s,d} & i = s \\ -\theta_{s,d} & i = d \\ 0 & \text{otherwise} \end{cases} \forall s, d \in V.$$

* * * * *